May 15, 1962 H. C. FLINT 3,034,829
HINGED BACK CUSHION MOVABLE WITH THE SEAT CUSHION
Filed Nov. 21, 1958 2 Sheets-Sheet 1

INVENTOR.
Hyland C. Flint
BY
Harness, Dickey & Pierce
ATTORNEYS.

May 15, 1962          H. C. FLINT          3,034,829
HINGED BACK CUSHION MOVABLE WITH THE SEAT CUSHION
Filed Nov. 21, 1958          2 Sheets-Sheet 2
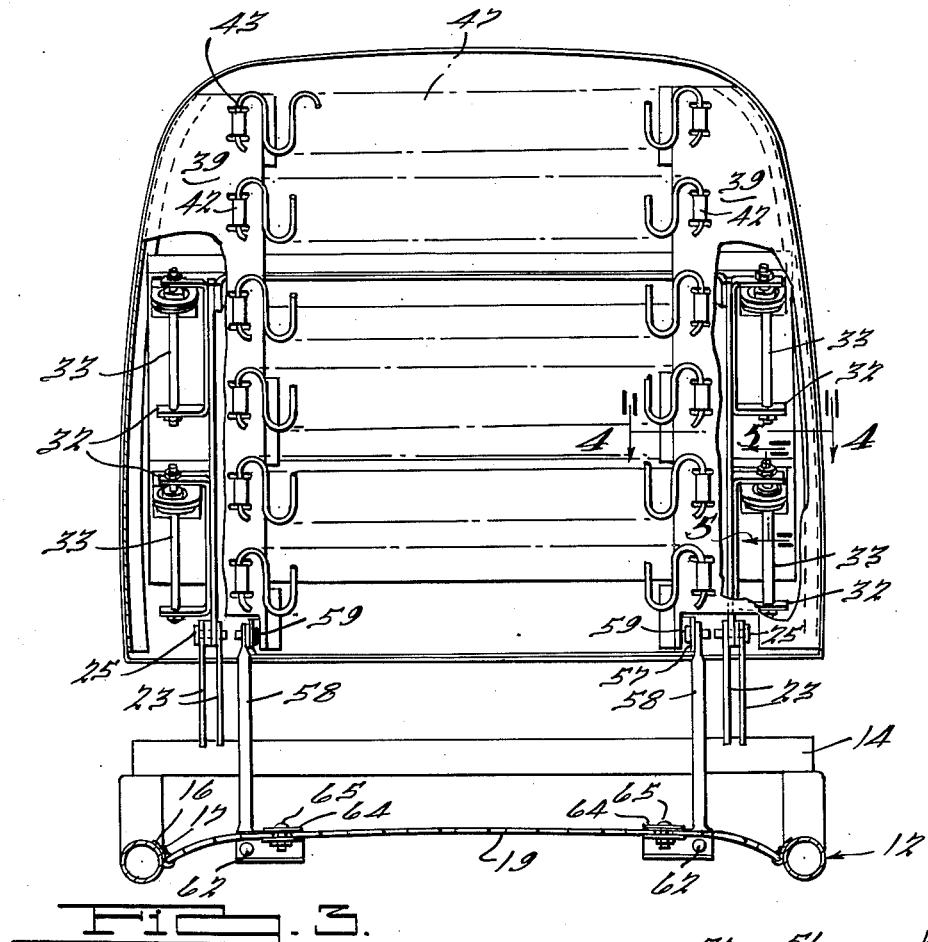
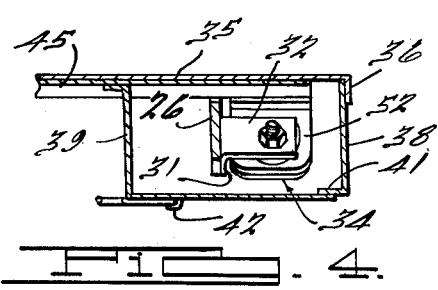
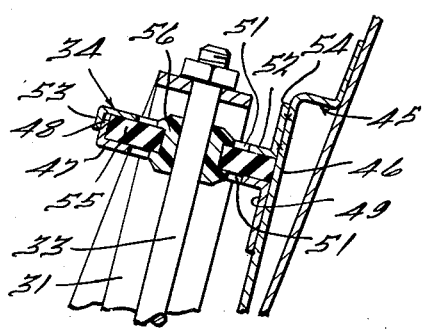
INVENTOR.
Hyland C. Flint.
BY
Harness, Dickey & Pierce.
ATTORNEYS.

United States Patent Office

3,034,829
Patented May 15, 1962

3,034,829
HINGED BACK CUSHION MOVABLE WITH THE SEAT CUSHION
Hyland C. Flint, 40550 W. Ten Mile Road, Novi, Mich.
Filed Nov. 21, 1958, Ser. No. 775,414
8 Claims. (Cl. 297—307)

This invention relates to seats having interconnected seat and back cushions, and particularly to a seat having a back cushion which moves vertically with the sprung portion of the seat cushion and which is foldable thereover.

While seats have been constructed heretofore having a back cushion which moved vertically with the sprung portion of the seat cushion, the present invention pertains to such a seat, so constructed as to permit the back cushion to fold forwardly over the seat cushion. The foldable action of the back cushion is desirable when the seat is employed in an automotive vehicle to increase the ease of movement of the occupant to and from the rear compartment thereof. The frame of the seat cushion has an upwardly extending support to which is pivoted a back cushion support on which rods are mounted having universally movable sliding elements to which the back panel of the back cushion is secured. The back panel on which the springs, padding and trim material are mounted, is movable upwardly and downwardly on the rods. One rod may be employed on each side of the supporting frame but in the present arrangement two parallel rods are utilized, tilted at an angle substantially medially between a vertical plane and the plane of the back cushion. This permits the movement of the back cushion upwardly and downwardly in a plane between the vertical and the angle of tilt of the back frame without binding.

The lower edge of the back frame has bifurcated supports for pivotally securing one end of a pair of spaced S-shaped arms. The pivots are aligned with the pivots which secure the supporting frame for the back cushion to the back rail of the seat cushion. The forwardly extending ends of the S-shaped arms are pivotally connected in a plane laterally of the seat to brackets which are secured to laterally extending sinuous spring strips which are secured to the side rails of the seat cushion frame. When the spring strips are deflected downwardly, the S-shaped arms are moved downwardly therewith to thereby move the back cushion downwardly in synchronism with the sprung portion of the seat cushion. The offset parallel disposition of the rods on which the universal elements slide substantially reduces the thickness of the back frame. A metal cover is provided at each side of the back panel enclosing the rods and universal elements and providing at the adjacent edges supports for sinuous spring strips which extend therebetween and provide resiliency for the back cushion.

Accordingly, the main objects of the invention are: to provide a seat and back cushion so connected as to permit the back cushion to move vertically with the sprung portion of the seat cushion and to be tilted forwardly thereover; to provide a seat and back cushion with a unison action and a thin construction for the back cushion by employing a plurality of rods and universal elemetns for supporting the frame of the back cushion; to support the back cushion on universal longitudinally movable supporting elements, a pair of which is mounted on each side of the back cushion and enclosed by a box-section structure which forms a support for spring strips which extend therebetween to provide resiliency to the central portion of the back cushion; and, in general, to provide a unison seat structure in which the back cushion moves vertically with the sprung portion of the seat cushion while being tiltable thereover, all of which is simple in construction, positive in operation and economical to manufacture.

Other objects and features of novelty of the invention will be specifically pointed out or will become apparent when referring, for a better understanding of the invention, to the following description taken in conjunction with the accompanying drawings, wherein:

FIG. 3 is a sectional view of the structure illustrated in FIG. 2, taken on the line 3—3 thereof;

FIG. 4 is an enlarged sectional view of the structure illustrated in FIG. 3, taken on the line 4—4 thereof, and FIG. 5 is an enlarged sectional view of the structure illustrated in FIG. 3, taken on the line 5—5 thereof.

Figures 1, 2:
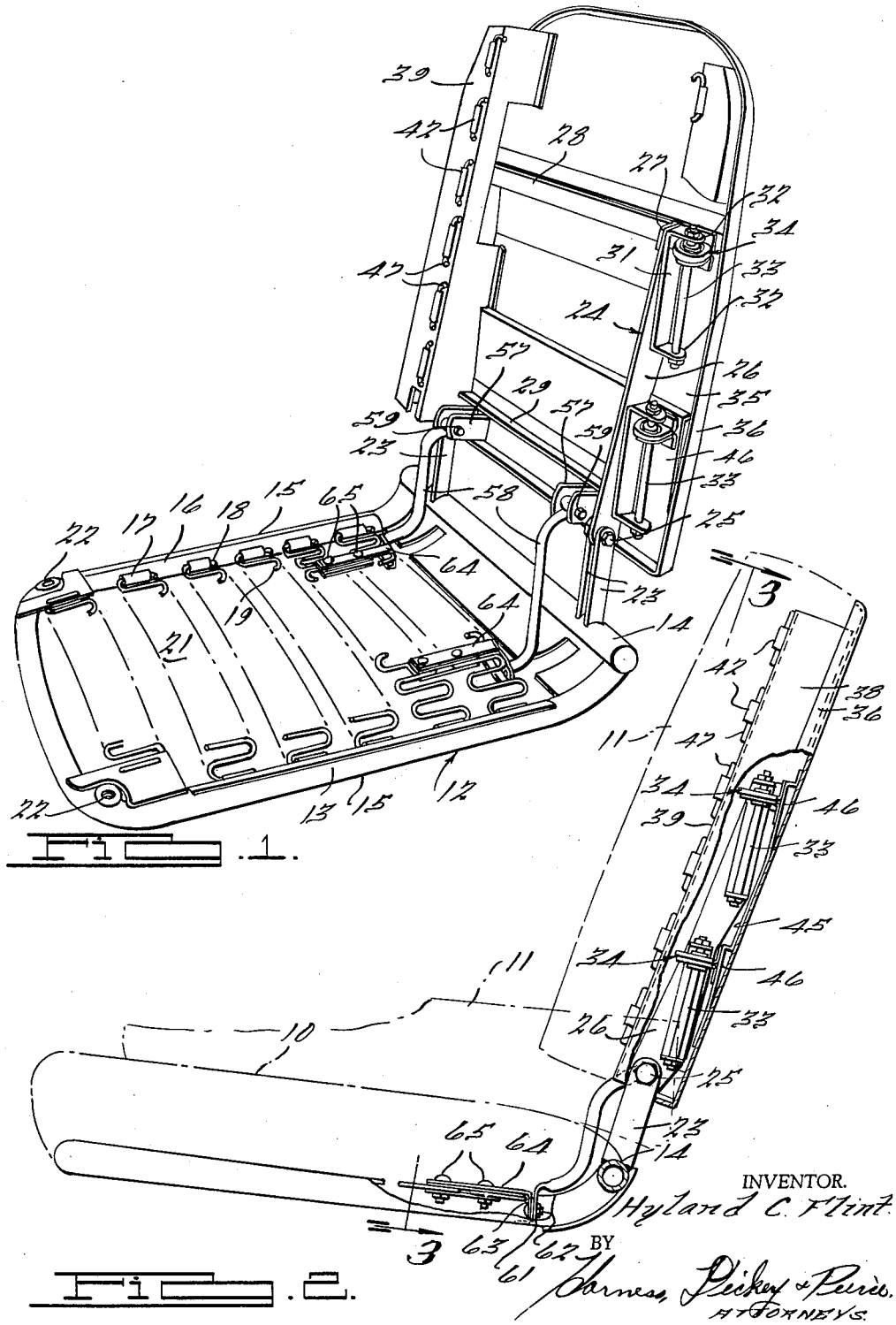
FIGURE 1 is a perspective view of a seat and back cushion frame interconnected and constructed in a manner conforming to the present invention.
FIG. 2 is a broken, side elevational view of the structure illustrated in FIG. 1.

Referring to FIGS. 1 to 5, the seat of the present invention embodies a seat cushion 10 and a back cushion 11 outlined in FIG. 2 with broken lines. A frame structure of the seat and back cushions is herein described in detail as the padding and trim material to be applied thereto are of conventional form and are not herein referred to in detail. The seat cushion has a seat frame 12 comprising a U-shaped tubular section 13, the rear open end of which is interconnected by a tubular section 14. The side rail portions 15 have a metal strip 16 welded thereto containing reversely bent tabs 17 in which the end portion 18 of sinuous spring strips 19 is secured to provide the sprung seating area 21 for the seat cushion. Threaded bosses 22 are secured to the front corners of the frame by which the frame is secured to a pair of supporting seat tracks (not shown) mounted on the floor of the vehicle. The rear tubular section 14 has two pairs of spaced upwardly extending arms 23 which function as supports for a back supporting frame 24 which is secured thereon by pivots 25.

The back supporting frame has vertically extending side members 26 interconnected at the top by the end flanges 27 of a crossbar 28. The side members 26 have channel-shaped brackets 31 secured thereto, the extending flanges 32 of which support rods 33 upon which universally tiltable sliding elements 34 are mounted. The brackets and rods are in aligned relation on each of the members 26 when viewed from the front but are in parallel offset relation when viewed from the side, as illustrated in FIG. 2. It can well be seen that if a rod 33 were extended to have a length equal to that occupied by both of the rods, the thickness of the back frame would be substantially doubled. By dividing the rods and offsetting them as illustrated in FIG. 2, a desirable thin back is obtained. Especially is this true when the axis of the rods is disposed at an angle substantially half way between the plane in the angle of tilt of the back seat cushion and the vertical plane.

A back cushion supporting panel 35 has the universal elements 34 secured thereto for movement therewith upwardly and downwardly on the four rods 31. The panel 35 has a flange 36 provided about its peripheral edge. An upstanding sheet 38 is secured to the flange 36 at both sides of the panel to which angle-shaped closure elements 39 are secured, having a flange 41 attached to the body portion of the panel 35. This completely encloses the elements 26 of the back cushion supporting frame, as well as the brackets 31, rods 33 and universal elements 34 at both sides of the back panel 35. The elements 39 have struckout portions 42 along the inner edges which function as tunnels for receiving the ends 43 of sinuously shaped spring strips 44 which span the two elements 39 and form a central resilient support for the back cushion. It will be noted that a plate 45 is mounted on the back panel 35 having two angle-shaped portions 46 which are disposed parallel to the rods 33 and to which the universal elements 34 are secured.

The universal elements 34, as illustrated in FIG. 5, are made from a bottom stamping 47 containing a central aperture 51. Three sides of the stamping 47 have an upstanding flange 48, the fourth side having a downwardly extending flange 49. The upper stamping 52 is similarly constructed, having a central aperture 51 and an outer flange 53 on three sides which extend over the flange 48 and a flange 54 disposed in the opposite direction in aligned relation to the flange 49. A sheet of rubber 55 is provided between the two stampings 47 and 52, the center of which supports the sliding element 56 of low friction material. The low friction material could be nylon, Dacron or other resin or tin, brass, bronze, sintered or other metal. The flanges 49 and 54 are welded to the surface of the sloping portions 46 of the plate 45 to rigidly secure the universal element 34 thereto. No binding can occur between the low friction element 56 and the rods 33 since the elements are free to tilt in any direction. The four rods and universal elements maintain the back cushion rigidly mounted upon the supporting frame 24 while permitting it to move upwardly and downwardly without any substantial resistance.

U-shaped brackets 57 are mounted on an angle member 29 at the bottom of the back cushion panel 35 to which the upper ends of a pair of S-shaped arms 58 are secured by pivots 59. The lower ends 61 of the S-shaped arms are flattened and secured by a rivet 62 to a downwardly extending flange 63 of a pair of plates 64 which are secured by bolts, rivets or the like 65 to two or more of the rearwardly disposed sinuous spring strips 19 of the seat cushion 10. With this arrangement, the S-shaped arms 59 are free to pivot relative to the seat forwardly and rearwardly, while the lower ends 61 are free to pivot laterally of the seat frame on the brackets 64 and thereby substantially reduce any tendency to bind at the ends.

When the seat cushion is unoccupied, the pivots 59 are substantially aligned with the pivots 25 and the back cushion may be tilted forwardly over the seat cushion to a position substantially parallel thereto lying directly thereupon. Any misalignment between the pivots is absorbed by the spring strips to which the brackets 64 are secured, aided by the pivoting of the lower ends 61 of the arms laterally of the seat. When the back cushion is in raised position, the occupant of the seat will cause the rearmost spring strips 19 to be deflected downwardly, causing the back cushion to be moved downwardly therewith due to the connection of the S-shaped arms 58 thereto. Any upward and downward movement of the occupant due to the movement of the vehicle will cause the back cushion to move upwardly and downwardly therewith as the rear spring strips 19 of the seat cushion are moved upwardly and downwardly due to the upward and downward movement of the occupant. In this manner, a unison action is provided between the back cushion and the surface of the seat cushion which enhances the driving comfort without detracting from the ease of entering and leaving the rear compartment of the vehicle since the back cushion readily hinges forwardly upon the seat cushion.

What is claimed is:

1. In a seat construction, a seat cushion frame having a sprung seating area, a back cushion, a back cushion supporting frame pivotally secured to said seat cushion frame, slide means securing the back cushion on the supporting frame, and arms interconnecting the back cushion to the sprung area of the seat cushion, said arms having pivoted ends which are substantially aligned with the pivot means connecting the supporting frame to the seat cushion, said slide means comprising rods and universally movable bushing means slidable on said rods.

2. In a seat construction, a seat cushion frame having a sprung seating area, a back cushion, a back cushion supporting frame pivotally secured to said seat cushion frame, slide means securing the back cushion on the supporting frame, and arms interconnecting the back cushion to the sprung area of the seat cushion, said arms having pivoted ends which are substantially aligned with the pivot means connecting the suppporting frame to the seat cushion, said slide means comprising rods and universally movable bushing means slidable on said rods, said universally movable means embodying a low friction element supported by a rubber washer secured within a housing.

3. In a seat construction, a seat cushion frame having a sprung seating area, a back cushion, a back cushion supporting frame pivotally secured to said seat cushion frame, slide means securing the back cushion on the supporting frame, arms interconnecting the back cushion to the sprung area of the seat cushion, said arms having pivoted ends which are substantially aligned with the pivot means connecting the supporting frame to the seat cushion, said slide means comprising rods and universally movable bushing means slidable on said rods, said universally movable means embodying a low friction element supported by a rubber washer secured within a housing, enclosing members for said slide means at each side of the back cushion, and sinuous spring strips secured between said enclosing members to form a resilient support for the center of the back cushion.

4. In a seat construction, a seat cushion frame having a sprung seating area, a back cushion, a back cushion supporting frame pivotally secured to said seat cushion frame, slide means securing the back cushion on the supporting frame, arms interconnecting the back cushion to the sprung area of the seat cushion, said arms having pivoted ends which are substantially aligned with the pivot means connecting the supporting frame to the seat cushion, said slide means comprising rods and universally movable bushing means slidable on said rods, said universally movable means embodying a low friction element supported by a rubber washed secured within a housing, enclosing members for said slide means at each side of the back cushion, and sinuous spring strips secured between said enclosing members to form a resilient support for the center of the back cushion, said arms being S-shaped with said aperture disposed transversely of the seat and having an aperture at the opposite end disposed longitudinally of the seat to permit pivoting of the ends in opposite directions.

5. In a seat construction, a seat cushion frame having a sprung seating area, a back cushion, a back cushion supporting frame pivotally secured to said seat cushion frame, slide means securing the back cushion on the supporting frame, arms interconnecting the back cushion to the sprung area of the seat cushion, said arms having pivoted ends which are susbtantially aligned with the pivot means connecting the supporting frame to the seat cushion, said slide means comprising rods and universally movable bushing means slidable on said rods, said universally movable means embodying a low friction element supported by a rubber washer secured within a housing, enclosing members for said slide means at each side of the back cushion, sinuous spring strips secured between said enclosing members to form a resilient support for the center of the back cushion, said arms being S-shaped with said aperture disposed transversely of the seat and having an aperture at the opposite end disposed longitudinally of the seat to permit pivoting of the ends in opposite directions, brackets secured to the rear portion of the sprung area of the seat cushion, and pivot means connecting the bracket to the longitudinally extending aperture of the arms.

6. In a back cushion construction for a seat, a supporting frame having side members, a pair of brackets on the side members supporting rods in parallel lateral relation but in offset forward relation to each other, universally movable slide elements on said rods, and a back cushion supported on said elements.

7. In a back cushion construction for a seat, a supporting frame having side members, a pair of brackets on the side members supporting rods in parallel lateral relation but in offset forward relation to each other, universally movable slide elements on said rods, a back cushion supported on said elements, said back cushion supporting frame being mounted at an angle to a vertical plane, and said rods being disposed at an angle between the vertical plane and the angle at which the back frame is mounted.

8. In a back cushion construction for a seat, a supporting frame having side members, a pair of brackets on the side members supporting rods in parallel lateral relation but in offset forward relation to each other, universally movable slide elements on said rods, a back cushion supported on said elements, a housing at each side of the back cushion enclosing said rods and slide elements, and sinuous spring strips interconnecting said housings forming a sprung area for the central portion of the back cushion.

References Cited in the file of this patent
UNITED STATES PATENTS

| | | |
|---|---|---|
| 1,762,623 | Hess | June 10, 1930 |
| 2,346,414 | Carpenter | Apr. 11, 1944 |
| 2,591,347 | Flint | Apr. 1, 1952 |
| 2,636,544 | Hickman | Apr. 28, 1953 |
| 2,750,995 | Parks | June 19, 1956 |
| 2,799,326 | Liljengren et al. | July 16, 1957 |
| 2,834,402 | Lautier | May 13, 1958 |